United States Patent [19]

Ohno

[11] 4,192,514
[45] Mar. 11, 1980

[54] SOUND REPRODUCING MECHANISM FOR TOYS

[75] Inventor: Tasuku Ohno, Tokyo, Japan

[73] Assignee: Stiron Chemical Industry Co. Ltd., Tokyo, Japan

[21] Appl. No.: 927,562

[22] Filed: Jul. 24, 1978

[30] Foreign Application Priority Data

Sep. 12, 1977 [JP] Japan ............................... 52-110144

[51] Int. Cl.² .............................................. G11B 3/00
[52] U.S. Cl. .................................. 274/1 A; 274/9 R; 274/14
[58] Field of Search ...................... 214/1 A, 9 R, 14 R

[56] References Cited

U.S. PATENT DOCUMENTS

| | | | |
|---|---|---|---|
| 2,523,340 | 9/1950 | Bonsall | 274/9 R |
| 3,422,566 | 1/1969 | Wolf | 274/9 R |
| 3,817,536 | 6/1974 | Buck | 274/1 A |
| 4,027,887 | 6/1977 | Watanabe | 274/1 A |

FOREIGN PATENT DOCUMENTS 1231457 12/1966 Fed. Rep. of Germany .......... 274/1 A

*Primary Examiner*—John W. Shepperd

[57] ABSTRACT

The present invention relates to a novel record player adapted for toys. The record player has a casing with a lid pivotally mounted to the upper surface. A turntable with a phonograph record attached thereto is rotatably secured to the underface of the lid. A pickup is mounted within the casing to allow a stylus to be reciprocatively movable along the grooves in the downward facing record. A mechanism for harmonizing the stylus pressure is provided on the upper portion of the casing consisting of a lever pivoted opposite the lid pivot and a spring to urge one end of the lever into engagement with the lid. Consequently, a part of the weight of the upper lid, turntable and record is applied to the stylus so that appropriate stylus pressure is obtained. At the end of one cycle of playback operation, the end of one lever is depressed to lift the lid disengage the stylus from the grooves and allow a spring to return the pickup to the original position.

2 Claims, 5 Drawing Figures

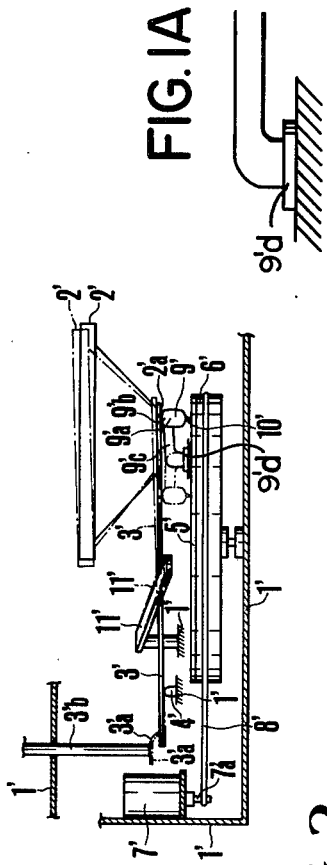
FIG. 1 PRIOR ART
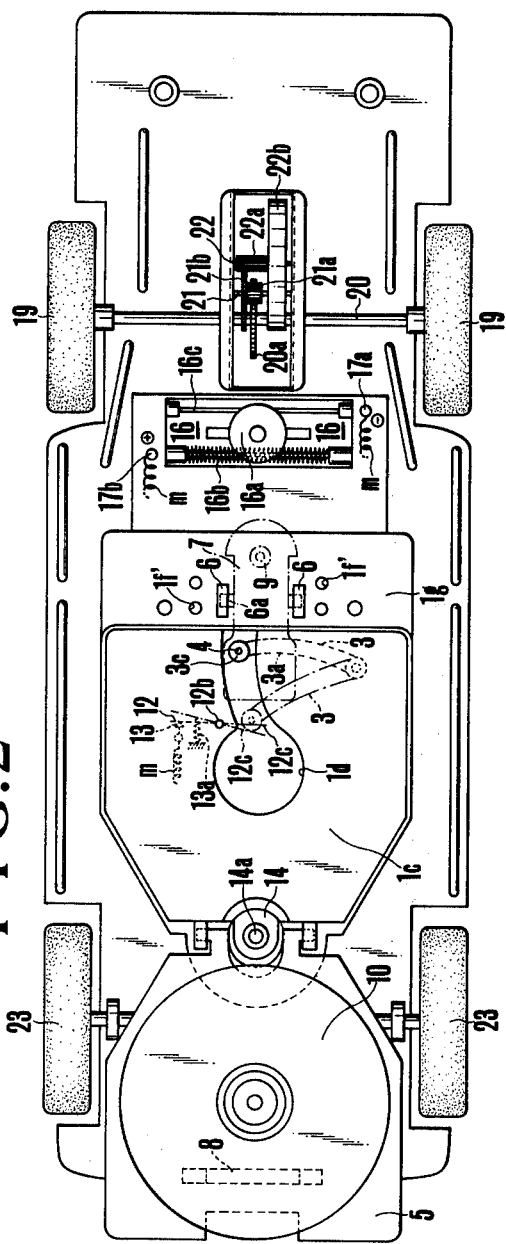
FIG. 1A
FIG. 2

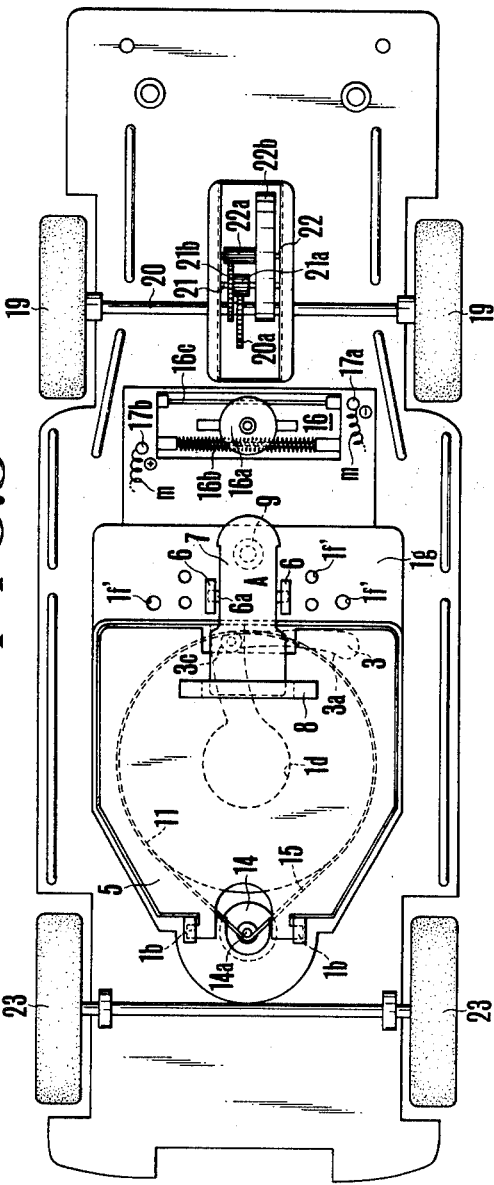
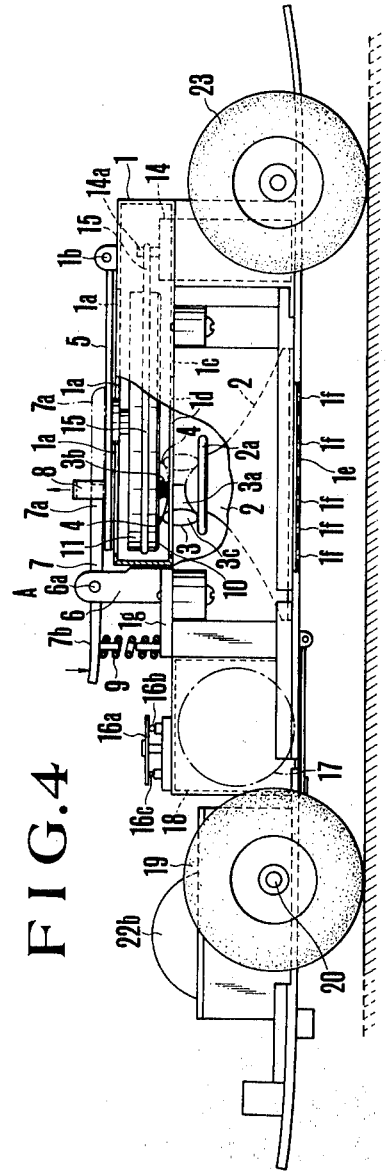
FIG. 3
FIG. 4

SOUND REPRODUCING MECHANISM FOR TOYS

CROSS-REFERENCE TO RELATED APPLICATION

This invention was filed in the Japanese Patent Office on Sept. 12, 1977, and the priority right that this application enjoys will be claimed to all the common subjects.

FIELD OF THE INVENTION

The present invention relates to a sound reproducing device for toys and, more particularly, to a sound reproducing device for toys characterized by the following points.

Since a turntable for retaining a phonograph record in position is rotatably mounted in the underface of an upper lid pivoted swingingly on a casing such that the stylus of a pickup located below the record is in upward engagement with the groove in the record, playback operation can easily be repeated by slightly and snappingly lifting up the the upper lid at the end of one cycle of playback operation. Further, since a part of the weight of the upper lid, turntable and phonograph record is applied to the stylus, appropriate stylus pressure is obtained during playback operation. Still further, since the rocking action of the upper lid is harmonized under the action of a mechanism for harmonizing stylus pressure which is mounted on a stepped portion of the casing's upper face, the original sound is faithfully reproduced without applying excessive forces to the stylus and groove. The sound reproducing device according to the present invention can easily be handled even by children due its simple construction, and can reproduce the sound of a beautiful tone quality that is substantially faithful to the original sound, thus giving pleasure to children. In addition, this sound reproducing device can compactedly be incorporated into any movable or immovable toy without taking much space.

DESCRIPTION OF THE PRIOR ART

In the prior art phonograph to be incorporated into a toy, a speaker with its leading tone portion turned up and a pickup movable in connection therewith was mounted in the upper portion of a casing, and the stylus of the pickup was in downward engagement with the groove in a phonograph record. However, each time one cycle of playback operation was finished, the free end of a lever plate for supporting the speaker was held down from above the casing by means of a rod member to lift up the speaker under the action of levers, whereby the stylus was out of engagement with the phonograph record. The pickup was then restored to the original position to permit repeated playback operation. Lifting up the speaker required considerable force. In addition, jumping or disengagement of the stylus from the groove often took place at a position where the linear velocity of the groove relative to the stylus was higher. Therefore, it was required to cause an increase in stylus pressure as by applying pressure to the stylus from above the lever plate with the aid of a leaf spring. Thus, greater force was required to lift up the speaker. Also, it was troublesome to precisely locate the bore in the casing through which the rod member was inserted so as to allow the lower end of the rod member to be in engagement with the free end of the lever plate from above the casing. Consquently, the phonograph was considerably intricate in construction and was difficult to manufacture, with the result that a number of parts were necessitated, leading to a rise in manufacturing cost. The present invention has been developed with a view to eliminating the aforesaid defects.

SUMMARY OF THE INVENTION

A first object of the present invention is to provide a novel sound reproducing device which renders repeated playback operation by the simple manipulation for which slight force is applied to the lever plate to such an extent that the upper lid is lifted up at the most accessible position of the casing; provides appropriate pressure to the stylus by making use of a part of the weight of the phonograph record, turntable and upper lid; permits faithful reproduction of the original sound by smoothly harmonizing the rocking movement of the upper lid caused by the engagement of the stylus with the groove through the lever plate and spring to enable smooth engagement of the groove relative to the stylus. Therefore, this sound reproducing device can be used without causing any damage to the stylus and groove for long periods of time, and can easily be manufactured at low cost due to its simple construction.

A second object of the present invention is to provide a sound reproducing device adapted for a toy phonograph which makes it possible to apply further pressure to the stylus within the range from the starting point to the terminal of the groove only by varying the shape, width and length of the front arm of the lever plate entering into the stylus pressure harmonizing mechanism and extending over the copper lid through a ring and pushing the upper lid to a desired extent.

BRIEF DESCRIPTION OF THE DRAWING

FIG. 1 is a view illustrative of part and operation of the prior art phonograph for toys.

FIG. 1a is a cross-sectional view of a detail of FIG. 1.

FIGS. 2 to 4 show the sound reproducing device for toy according to the present invention wherein FIG. 2 is a plan view showing a state where the upper lid of the sound reproducing device according to the present invention is turned inside out, which is housed in the casing of a toy vehicle, and FIGS. 3 and 4 are a plan view and a side view partially broken away showing a state where the upper lid of the sound reproducing device according to the present invention is closed, respectively.

DESCRIPTION OF THE PREFERRED EMBODIMENTS

A sound reproducing mechanism of a phonograph for toys is shown in FIG. 1. A lever plate 3' mounted to the bottom 2'a of a speaker 2' while turning up the opening portion of a cone type diaphragm housed in a casing 1', is supported on a fulcrum 4', and a lower end of a rod 3'b inserted through a bore in the casing 1' is engagement with a free end 3'a. A turntable 6' for retaining upward a phonograph record 5' is rotatably supported on the inside bottom of the casing 1'. A belt 8' is stretched between the shaft 7'a of a motor 7' and the turnable 6' to drive the turntable. Numeral 9' denotes a pickup, the boss 9'a of which is in contact with the bottom 2'a of the speaker 2' during the movement of its arm 9'c. In this case, the arm 9'c rocks on the fulcrum against the action of a spring 9'd, so that a phonograph stylus 10' attached to the boss portion 9'a is in engagement with a groove. As above mentioned, in order to prevent jumping or disengagement of the stylus from the groove according to the magnitude of linear velocity of the groove with respect to the stylus, a spring plate 11' mounted through a suitable support member in the casing 1' is brought into abutting contact with the lever plate 3' with a view to raise the stylus pressure. Playback operation is initiated from the starting point of the groove located on the peripheral portion of the record 5' and is terminated at the central portion thereof to complete one cycle of playback operation. At the end of this cycle, a motor circuit is switched off (not shown) by the arm 9'c of the pickup 9'. Thereupon, when the free end 3'a of the lever plate 3' is held down from above the casing with the aid of the rod 3'b, the speaker 2' is lifted up together with the spring plate 11' so that the pickup 9' is lifted up by the spring 9'd located in position and returns to the starting point to close the motor circuit. The rod 3'b is then restored to the original state so that the stylus pressure is again applied thereto to repeat playback operation. Thus, each time the operation comes to an end, the speakers 2' must be lifted up against the spring force of the spring plate 11'. This causes that considerably excessive force is exerted on the speaker. Furthermore it is required that the bore for putting down the rod 3'b from the upper face of the casing be precisely located so as to achieve satisfactory engagement of the rod with the free end 3'a of the lever plate 3', resulting in the production of the prior art playback mechanism being much troublesome. Still further, the prior art playback mechanism is of substantially complex structure since the spring plate 11' must be provided and the lever plate 3' must be attached to the bottom 2'a of the speaker 2' in integral fashion.

Thus, the prior art playback mechanism is difficult to manufacture and its manufacturing cost is relatively high.

The present invention has been developed with a view to obviating the aforesaid disadvantages.

The present invention will now be illustrated with reference to the drawing. In FIG. 4, the left side indicates the rear portion of the playback mechanism according to the present invention and the right side the front portion thereof. A speaker 2 is fixed to the inside bottom of a case 1 with the opening portion of its cone diaphragm turned down, and the case 1 is provided at its outside bottom 1e with several apertures for transmitting the sound of the speaker. The underface of a boss 3c of a pickup 3 travels against a spring 3b, while it is in contact with the back plate 2a of the speaker 2. During this travel, a stylus 4 attached to the boss 3c is in engagement with a groove in a phonograph record 10. An upper lid 5 is swingingly pivoted 1b on the peripheral edge of the opening portion 1a of the casing 1 and a lever plate 7 is pivoted between support plates 6 and 6 mounted in a bored (1f), stepped portion 1g of the upper face of the casing 1 on the diametrically opposite side and astride this pivoting point 1b and the opening portion 1a. The front arm 7a of the lever plate 7 is fitted into a ring 8 mounted on the upper lid 5 in snap-fit relation thereto, and spring 9 is interposed between the rear arm 7b of the aforesaid plate and the stepped portion 1g. The combination of a set of the support plates 6 provided vertically on the stepped 1g the lever plate 7, the spring 9 and the ring 8 on the upper lid is hereinafter generally referred to as the mechanism A for harmonizing stylus pressure. In performing playback operation the upper lid 5 is permitted to rock in response to the depth of the groove in engagement with the stylus. This causes that the front arm 7a of the lever plate 7 is forced down by the peripheral edge of the upper face of the upper lid 5 and the rear arm 7b compresses the spring 9. The absence of the force for pushing down the upper lid 5 then allows the front arm Da to moderately force down the upper lid (5) by the restoring force of the springs 9. Thus, the rocking movement of the upper lid 5 is resiliently controlled by the lever plate 7 and spring 9 such that the rocking movement is harmonized without suffering any abrupt change. Consequently the stylus is allowed to smoothly track the groove with the result that the former is in continuous engagement with the latter, thus leading to in prevention of jumping or disengagement of the stylus from the groove. This renders faithful playback and enables the extended use of the record, stylus or groove without causing damage thereto. At the end of a performance, the rear end of the rear arm 7b of the lever plate 7 is slightly forced down so that the front arm 7a is lifted up and is in engagement with the ring 8. As a consequence, the upper lid 5 is slightly lifted up to cause disengagement of the stylus from the groove. The pickup 3 is then restored to the original position by the restoring force of the spring 3b. At the same time, the both electric contacts 12 and 13 are closed, whereby the motor is driven so that playback operation is again continued.

As shown by dashed lines in FIG. 4, the underface of the front arm 7a of the lever plate 7 is adapted to be held down on the upper lid 5. In addition, the linear velocity of the groove relative to the stylus varies within the range from the outer peripheral portion of the record to the inner peripheral portion by optionally selecting the shape, width and length of the front arm. Consequently, it easy to apply stylus pressure to necessary portions. It will be understood that the shape, width and length of the front arm Da of the lever plate 7 can easily be determined in fabrication. A diaphragm plate 1c is provided at a generally halfway position of the inner depth of the casing 1. The upper portion of the boss 3c of the pickup 3 is designed to be exposed and moved together with the stylus 4 within a guide hole 1d formed in the diaphragm plate 1c while the stylus 4 is in engagement with the groove. The weight of the upper lid 5, turntable 11 and record 10 is attached to the stylus 4, so that suitable stylus pressure is obtained during playback operation. In order to open the meter driving circuit m at the end of playback operation, the lever plate 12c pivoted 12b on the diaphragm plate 1c is provided at its one end with a movable contact 12, which is always brought in contact with a fixed contact 13 connected to the circuit m for driving the motor 4 including a power source 17 through a spring 13c to drive the motor. When the pickup 3 travels and its stylus reaches the terminal of the groove, the boss 3c thrusts the free end of the lever plate 12c to open both electric contacts 12 and 13, whereby the motor is stopped to cause the turntable to come to a halt.

Numeral 16 denotes a current control resistance for the motor driving circuit m, 16a a slider; 16b a resistance line; and 16c a conductor connected to the minus electrode of the power source. Numeral 17b denotes the plus electrode of the power source. The motor 14 is connected between the plus and minus electrodes of the power source. Numeral 18 denotes a battery box having a battery 17 therein. Numeral 19 denotes driving wheels which are adapted to cause a gear 20 attached to a shaft 20 to mesh with the pinion 21a of another shaft 21. The gear 21 of the shaft 21 is then caused to engage a pinion 22a attached to other shaft 22 thereby to rotate a flywheel 22b of the shaft 22. Numeral 23 denotes driven wheels. As the driving wheels are caused to slide on a floor, a series of the above-mentioned gears engage one another to rotate the flywheel 22b for acceleration, so that the toy car is driven simultaneously with playback operation.

Incidentally, the shape, width and length of the lever plate as well as the shape of the toy illustrated in the drawings may be modified as required. Also, it is noted that the switching mechanism incorporated into the motor driving circuit and other members may be modified within the scope described and illustrated in the specification and drawings without departing from the spirit of the present specification.

According to the present invention the gist of which resides in the structure as above mentioned, the upper lid 5 adapted to support the record 10 and turntable 11 is lifted up by the simple manupulation for which the rear arm 7b of the lever plate 7 is snappingly pushed, whereby the stylus is out of engagement with the groove so that playback operation is repeated continuously. Such manipulation can be carried out at the most accessible part of the upper portion of the casing 1, and can, therefore, be effected even by infants or children with safeness, thus giving them a scientific education. A part of the weight of the phonograph record 10, turntable 11 and upper lid 5 is adapted to be applied to the upward stylus 4 of the pickup 3 so that suitable stylus pressure is attained. Therefore, no particular mechanism is needed, resulting in more simple construction and easier production at low cost.

Furthermore, the front arm of the lever plate 7 is in snap-fit into the ring 8 of the upper lid 5 so that the rocking movement of the upper lid 5 caused by the engagement of the stylus with the groove is controlled by the lever plate 7 and the relatively weak spring 9. This ensures that it is possible to completely prevent jumping or disengagement of the stylus from the groove, which is caused by the abrupt rocking movement of the upper lid, thus enabling the smooth engagement of the stylus with the groove. Thus, playback operation can be repeatedly carried out ever by children with easeness to reproduce the sound which is substantially faithful to the original sound.

Furthermore, the underface of the front arm 7a of the lever plate 7 is adapted to hold down the upper lid 5 to cause the weight of the arm to be impressed thereon, and the shape, width and length of the front arm 7a extending in the forward direction can be easily varied as required. This ensures that the necessary area of the upper lid 5 is held down to apply stylus pressure to the given area over a range from the outer periphery to the inner periphery of the phonograph record depending upon the linear velocity of the groove relative to the groove, thereby increasing further the efficiency of reproducing the original sound.

The reproducing device according to the present invention is extremely simple in construction; is formed by a limited number of parts; and is easily mounted and fabricated. This increases the playback operation efficiency and ensures that suitable stylus pressure is always attained without regulating it depending upon the linear velocity of the stylus relative to the groove. Thus, this device can sufficiently be mass-produced at low cost. Furthermore, the lever plate can be made wider or longer as desired. This ensures that pressure is applied to any portion of the phonograph record, i.e., the groove, from above the upper lid as required, but without having an adverse effect on the pulling-up operation of the upper lid.

What is claimed is:

1. A sound reproducing device for toys comprising: a speaker 2 fixed to the inner bottom of a casing 1 in a state where the opening portion of a cone type diaphragm is turned down; a pickup 3 pivoted on the casing through a suitable support member located therein such that, while it permits an upward stylus 4 mounted on a boss 3c to be in engagement with a groove, it is caused to move against a return spring 3b and the boss 3c is caused to be in connection with the speaker 2 during playback operation; an upper lid 5 pivoted 1b swingingly on the upper opening 1a of the casing 1 and provided rotatably with a turntable 11 on the under face of which a phonograph record is supported; and a mechanism 7a for harmonizing stylus pressure in which a lever plate 7 is pivoted 6a between support plates 6 and 6 mounted on a stepped portion 1g of the casing 4 which is diametrically opposite to the pivoting point 1b of the upper lid 5, the front arm 7a of the lever plate 7 is snap-fit into a ring 8 mounted on the upper lid 5 and a relatively weak spring 9 is interposed between the rear arm of the lever plate 7 and the upper face of the stepped portion 1g.

2. A sound reproducing device for toys as claimed in claim 1, in which the front arm 7a of the lever plate 7 of the mechanism 7a for harmonizing stylus pressure is adapted to apply given stylus pressure to the desired area of the phonograph record by selecting optionally the shape, width and length thereof such that the underface of the front arm 7a is always in abutting contact with the upper face of the upper lid 5.

* * * * *